United States Patent [19]

Grinberg et al.

[11] 4,387,485
[45] Jun. 14, 1983

[54] METHOD OF EXTRACTING MEAT OF SMALL CRUSTACEANS

[76] Inventors: Efim N. Grinberg, ulitsa Bazhova, 13, korpus 2, kv. 119; Yakov I. Braginsky, ulitsa Moldagulovoi, 28, korpus 3, kv. 64; Yakov M. Zhislin, Fakultetsky pereulok, 4, kv. 19; Vladimir V. Lavrov, ulitsa Narodnogo Opolchenia, 23, korpus 1, kv. 63; Viktor A. Mitrofanov, bulvar Generala Karbysheva, 18, korpus 1, kv. 19; Nikolai A. Nikitushkin, ulitsa Volgina, 15, korpus 1, kv. 43; Alexandr A. Filatov, Yaroslavskoe shosse, 134, kv. 22; Jury F. Yaroshenko, Novo-Basmannaya ulitsa, 17, kv. 103; Samuil S. Torban, ulitsa Bolshaya Polyanka, 30, kv. 305; Viktor M. Kovalev, ulitsa Shipilovskaya, 41, korpus 1, kv. 140; Georgy I. Urusov, Preobrazhensky val, 24, kv. 135; Alla V. Rozanova, Amstradamskaya ulitsa, 9, stroenie 1, kv. 1; Tatyana N. Radakova, 1 Akademichesky proezd, 15, kv. 25; Larisa I. Krivosheina, Sevastopolsky prospekt, 83, korpus 1, kv. 47; Vladimir P. Bykov; Vladimira M. Bykova, both of Chertanovskaya ulitsa, 1a, korpus 1, kv. 84; Igor V. Gultsev, ulitsa Malaya Schukinskaya, 15, kv. 78, all of Moscow, U.S.S.R.

[21] Appl. No.: 38,792

[22] Filed: May 14, 1979

[30] Foreign Application Priority Data

May 15, 1978 [SU] U.S.S.R. ............................. 2614820

[51] Int. Cl.$^3$ ............................................. A22C 29/02
[52] U.S. Cl. ........................................ 17/48; 17/73; 17/51

[58] Field of Search .................. 17/51, 53, 71, 73, 74, 17/46, 48, 45; 99/570, 518, 525, 526

[56] References Cited

U.S. PATENT DOCUMENTS

| | | | |
|---|---|---|---|
| 2,360,983 | 10/1944 | Scarff | 99/570 X |
| 2,978,334 | 4/1961 | Lapeyre | 17/71 X |
| 3,408,686 | 11/1968 | Stephenson | 17/51 X |
| 3,688,344 | 9/1972 | Carlson | 17/51 X |
| 4,133,077 | 1/1979 | Jasniewicz et al. | 17/71 X |
| 4,148,112 | 4/1979 | Marvin | 17/53 |

*Primary Examiner*—Willie G. Abercrombie
*Attorney, Agent, or Firm*—Lackenbach, Lilling & Siegel

[57] ABSTRACT

The essence of the method of extracting or recovering meat of small crustaceans, e.g. antarctic krill, resides in that crustaceans are introduced into an air flow relative to the surface of the crustaceans at a given velocity required for creating a pressure drop across the internal space or cavity of the crustaceans and the air flow. Consequently, the inter-cavity pressure breaks up the shell and destroys the links between the muscular tissue and other components. When the crustaceans proceed along a helical path, the muscular tissue can be completely separated at the final stage of the treatment. The treatment of crustaceans is performed in stages, the air flow velocity relative to the surface of the crustaceans at the first treatment stage being about 500 m/s, at the second stage—from 200 to 300 m/s, and at the third stage—from 100 to 200 m/s. The disclosed method of recovering the meat of crustaceans as a single lump of the muscular tissue without the shell, lipides, gastrointestinal tract and other unwanted matter simplifies and speeds up the meat-extraction process. Productivity and yield of usable product are increased. The meat thus obtained is used for preparing high-quality food products. The method makes it possible to use simple and economically effective technology performable directly by the fishing fleet facilities, for treating antarctic krill which is a new and unorthodox type of sea food.

4 Claims, No Drawings

METHOD OF EXTRACTING MEAT OF SMALL CRUSTACEANS

FIELD OF INVENTION

The present invention relates to the technology of treating sea products to supply food for humans, and, more particularly, it relates to a method of extracting the meat of small crustaceans.

Although the invention is specifically designed for the treatment of antarctic shrimp or krill, it may be also widely utilized by the fishing industry for treating other kinds of sea and ocean shrimp and the like.

Furthermore, the present invention can also be used by a variety of industries including agricultural production and mixed animal food manufacturing.

BACKGROUND OF INVENTION

Antarctic krill is one of the most reliable large-scale sources of animal-derived protein-containing food. The catches of krill may well surpass the total level of fish catches in the whole world. The most valuable component of krill is its pure meat whose chemical composition is close to that of the meat of crabs and shrimps, and contains numerous valuable and vital amino-acids and microelements. However, for the meat of krill to be usable as food, it has to be completely separated from the shell.

Pure meat extracted or recovered from krill should have a minimum content of lipides, should be devoid of the remnants of the liver and of the contents of the gastrointestinal tract, the last of which affects the quality of the product and curtails its storage period.

When one considers that the krill-catching areas, more often than not, are far away from the bulk of the consumers, and that the transportation of krill takes considerable time for the same reason, the best solution is to treat krill directly where it is being caught, to obtain therefrom pure meat as a ready-to-use product, e.g. natural canned meat, or else as a semi-finished food, e.g. deep-frozen meat.

Known in the art is a method of separating the meat of crustaceans from the shell, including loading the crustaceans, forwarding them along a helical path, mechanically destroying the shell with aid of rotating discs with sharp burrs on their peripheries, and separating the meat from shell fragments by flotation.

With shrimps being treated by this known method, their meat is obtained as individual lumps; however, considerable deformation and disintegration of the meat lumps take place, which affects both the quality and appearance of the final product. Besides, the abovedescribed known method is usable for treating relatively large shrimp and is impractical for separating the shell of small crustaceans, e.g. krill. There is further known a method of separating the head of a shrimp from the body thereof by destroying the ties between the head portion and the body with a high-velocity flow of fluid. The essence of this method resides in a shrimp being positioned so that its head and body are introduced into a high-velocity water flow, the area of the connection of the head portion and the body being positioned adjacent to the edge of a stationary element. The effort being created by the high-velocity fluid flow is directed either at the head portion or the body of the shrimp, whereby the head portion and the body are separated.

The last-described method only separates the head portions of crustaceans from their bodies. The rest of the operations involved in breaking up the shell, extracting the meat and separating one from the other are performed by other methods. Thus, the last-described known method would not obtain pure meat, whereas the repeated operations of extracting the meat from the body and separating the components inflict inevitable losses and affect the taste of the final product on account of the latter's prolonged contact with a liquid.

The last-described method is likewise devised for treating relatively large shrimp and cannot be used for treating krill. Furthermore, the singular technique of treating shrimps essentially curbs down the productivity of the method.

There is also known a method of removing the shell of crustaceans, e.g. crabs (disclosed in the DE Pat. No. 2,430,095; Int. Cl.$^2$ A 22 C 29/02, published in 1976), including singular treatment of crustaceans by carrying them in an air flow past blade-like teeth and scrapers, in which way mechanical removal of the shell of crustaceans is effected.

The last-mentioned hitherto known method also includes classifying the crustaceans to be treated into fractions, indexing the crustaceans to be treated and treating them singularly within each fraction.

The above operations are labor-consuming, complicated and affect productivity.

Besides, the method does not provide for destroying such components as the liver and gastrointestinal tract, which does not enable production of pure meat. Furthermore, with the technique having been specifically devised for treatment of large crustaceans, it cannot be employed for treating antarctic krill.

Thus, the hitherto known methods of treating crustaceans, solving as they do the problem of obtaining edible products in different ways and to a different degree, cannot be employed for treating small crustaceans, e.g. antarctic krill. These methods are characterized by a limited ability of obtaining pure meat from the crustaceans. They do not provide an automated and highly productive process of treating small sea crustaceans.

BRIEF DESCRIPTION OF THE INVENTION

It is an object of the present invention to create a method of extracting the meat of small crustaceans, which should enable production of high-quality food products including natural canned meat and deep-frozen meat.

This object is attained in a method of extracting meat of small crustaceans, including introducing the crustaceans into an air flow, in which method, in accordance with the invention, the destruction of the shell and its separation from meat is effected by moving the air flow relative to the surface of the crustaceans at a predetermined velocity necessary for creating a pressure differential between the internal space or cavity of the crustaceans and the air flow.

It is expedient to conduct the treatment of crustaceans stage-wise, with a predetermined velocity of the air flow relative to the surface of the crustaceans at different stages of the treatment being different.

It has been found most effective to set the air flow velocity during the first stage of the treatment of the crustaceans, including the separation of the chitinous parts and destroying the links between the gastrointestinal tract with the muscular tissue, substantially equal to 500 m/s. The second stage includes destroying the links between the cephalothorax and the muscular tissue and partly separating the latter, at an air flow velocity substantially within the range from 200 to 300 m/s. The third stage includes the complete separation of the muscular tissue from the cephalothorax, at an air flow velocity substantially within the range from 100 to 200 meters per second.

It has been further found expedient, in order to effect the final destruction of the links between the muscular tissue and the liver at the final stage of the treatment, to have the air flow moving relative to the surface of the crustaceans along a helical path.

DETAILED DESCRIPTION OF THE INVENTION

The herein disclosed method of extracting meat of small crustaceans is based on physical phenomena created by the action exerted upon the crustaceans by an air flow moving relative to the surface of the crustaceans at a given velocity.

A single krill species includes a closed shell or crust enclosing therein the muscular tissue connected to the shell, the liver accommodated in the cephalothorax, the gastrointestinal tract and other components. The essential portion of the lipides contained in the krill is accumulated in the liver and in the connecting tissues adjoining the shell.

The essence of the herein disclosed method is, as follows.

As an air flow is movig relative to krill, suction is created adjacent to the latter's surface, whereby the pressure inside the internal space or cavity of the krill becomes higher than that at the latter's surface. Under predetermined conditions this excessive pressure becomes sufficient for destroying or breaking up the shell, the gastrointestinal tract, the liver, and also the links or ties between the muscular tissue and the shell. Being as it is the most endurable component, the muscular tissue is yielded by the abovedescribed operation as a single unitary lump devoid of the rest of the components containing a substantial quantity of lipides.

The disclosed method can be effected in the following way. A mass of krill in a size range from 25 mm to 60 mm, which practically covers the entire range of sizes of the krill that is caught, is directed in bulk into an air flow, without any preclassification by and any preindexing. The treatment of the krill by the air flow is effected stage-wise, the first stage including having the air moving relative to the surface of the crustaceans at a velocity substantially equal to 500 meters per second (m/s) to separate the chitinous parts and to destroy the links or ties between the gastrointestinal tract and the muscular tissue. At the second stage, the air flows at a relative velocity substantially from 200 to 300 m/s to sever the ties between the cephalothorax and the muscular tissue and to partly separate the latter. At the third stage the relative velocity of the air flow is set substantially within the range from 100 to 200 m/s to completely separate the muscular tissue from the cephalothorax.

At the last-mentioned terminal stage of the treatment the air flow is made to flow relative to the crustaceans along a helical path to provide for intense turbulence of the air and of the crustaceans in curvilinear flow, so that final separation and destruction of the links between the muscular tissue with the liver, gastrointestinal tract and other components of the krill take place.

At each one of the abovementioned treatment stages it is expedient to vary the respective velocities substantially within the specified ranges, depending on the actual chemical and physical conditions of the initial stock, its size and other factors.

The final separation of the muscular tissue from the shell and remnants of the liver, gastrointestinal tract and other foreign matter is effected by either flushing, of winnowing, or flotation.

The performability of the herein disclosed method of extracting meat of small crustaceans will be illustrated hereinbelow by the following examples.

EXAMPLE 1

Antarctic krill in a size range from 25 to 35 mm is directed in bulk, without any preclassification and preindexing, into an air flow flowing relative to the surface of the crustaceans at a velocity of 500 m/s, whereby the shell and the links between the muscular tissue and the liver and gastrointestinal tract are practically instantly broken up and destroyed. Then the partly broken up krill is subjected to the second stage action of an air flow flowing along a helical path at a velocity of 200 m/s relative to the surface of the krill. At this stage the links between the cephalothorax and the muscular tissue are severed, and the muscular tissue becomes completely separated from the cephalothorax. The recovery of pure meat is subsequently effected by flotation. The yield of the pure meat amounts to 22 percent of the mass of the intitial stock.

EXAMPLE 2

Antarctic krill in a size range from 30 to 45 mm is directed in bulk, without any preclassification and preindexing, into an air flow flowing at a 500 m/s velocity relative to the surface of the krill. The destruction of the shell and the severing of the links between the muscular tissue and the liver and the gastrointestinal tract take place almost instantly. At the second stage the partly broken up krill is subjected to the action of an air flow flowing at a 250 m/s velocity relative to the surface of the crustaceans. At this treatment stage the links between the cephalothorax and the muscular tissue are severed, and the latter is partly separated. Then the product is subjected to the third stage of the treatment by an air flow flowing at a 100 m/s velocity relative to the surface of the crustaceans. At this stage the muscular tissue becomes completely separated from the cephalothorax. Throughout the second and third stages of treatment, the air flow is made to flow along a helical path. The recovery of the pure meat is effected by winnowing. The yield of the pure meat amounts to 24 percent of the mass of the initial stock.

EXAMPLE 3

Antarctic krill in a size range from 40 to 55 mm is directed in bulk, without any preclassification and preindexing, into an air flow flowing at a 500 m/s velocity relative to the surface of the crustaceans. The shell and the links between the muscular tissue and the gastrointestinal tract and the liver are broken up and severed almost immediately. At the second treatment stage the partly broken up krill is subjected to the action of an air flow flowing at 250 m/s velocity relative to the surface of the crustaceans, whereby the ties between the cephalothorax and the muscular tissue are broken up and severed, and the latter is partly separated. Then the product is subjected to the second treatment stage by the action of an air flow flowing at a velocity of 150 m/s relative to the surface of the crustaceans. At this stage the muscular tissue is completely separated from the cephalothorax. During the second and third treatment stages the air flow is made to flow along a helical path. The recovery of the pure meat is effected by winnowing. The yield of the pure meat amounts to 24.5 percent of the mass of the initial stock.

EXAMPLE 4

Antarctic krill in a size range from 45 to 60 mm is directed in bulk, without any preclassification and preindexing, into an air flow flowing at a 500 m/s velocity relative to the surface of the crustaceans, whereby the shell is broken up and the links between the muscular tissue and the liver and gastrointestinal tract are severed. At the second stage of the treatment the partly broken up krill is subjected to the action of an air flow flowing relative to the surface of the crustaceans at a velocity of 300 m/s. At this stage the links between the cephalothorax and the muscular tissue are severed, and the latter is partly separated. Then the product is subjected to the third stage of the treatment by the action of an air flow flowing at this stage at a 200 m/s velocity relative to the surface of the crustaceans. During this stage the muscular tissue becomes completely separated from the cephalothorax. During the second and third treatment stages the air flow is made to flow along a helical path. The recovery of the pure meat is effected subsequently by flotation. The yield of the pure meat is 25 percent of the mass of the initial stock.

The herein disclosed method of extracting meat of small crustaceans offers a possibility of obtaining new kinds of edible produce of animal origin from antarctic krill which is as yet un unorthodox source of sea food. The method recovers krill meat free of the remnants of the liver and of the gastrointestinal tract, of lipides and other foreign matter. The absence in the krill meat thus obtained of the liver and the minimum content therein of the rapidly oxidizing lipides prevent any variation of the color, the taste and the flavor of the meat at subsequent thermal treatment, i.e. at sterilisation, which prolongs the permissible storage time of any kind of foodstuffs that can be prepared with the use of krill meat, and, first and foremost, of canned food.

The utilization of the herein disclosed method introduces a simple and cost-effective technology of processing small crustaceans, and offers a possiblity of profitably setting up facilities for bulk treatment of krill on an industrial scale.

The realization of such technology either directly in the fishing and accompanying vessels, or in land-based plants opens up prospects of helping attain the important goal of providing human beings with high-quality food rich in proteins of animal origin.

What we claim is:

1. A method of extracting meat of small crustaceans, comprising the following sequence of steps:
   introducing the crustaceans into an air flow;
   breaking up the shells of the crustaceans and separating the meat therefrom by making said air flow relative to the surface of said crustaceans at a predetermined velocity sufficient for creating a pressure differential between the internal cavity of said crustaceans and the said air flow.

2. A method as set forth in claim 1, wherein said breaking up of the shells and separating them from the meat is effected in stages, said velocity of said air flow relative to the surface of said crustaceans being set differently at different ones of said stages.

3. A method as set forth in claim 1, wherein said air flow is made is flow along a helical path relative to said crustaceans.

4. A method as set forth in claim 2, wherein at the first stage of the treatment of said crustaceans, including separating the chitinous components and severing the ties between the gastrointestinal tract and the muscular tissue, said predetermined velocity of the flow of said air is set substantially at 500 m/s; at the second stage including severing the ties between the cepholothorax and the muscular tissue and partly separating the muscular tissue said predetermined velocity is set substantially within a range from 200 to 300 m/s; and at the third stage including complete separation of the muscular tissue from the cephalothorax said predetermined velocity is set substantially within a range from 100 to 200 m/s.

* * * * *